US008754603B2

(12) United States Patent
Arnett et al.

(10) Patent No.: US 8,754,603 B2
(45) Date of Patent: Jun. 17, 2014

(54) METHODS, SYSTEMS AND APPARATUS FOR REDUCING POWER LOSS IN AN ELECTRIC MOTOR DRIVE SYSTEM

(75) Inventors: Michael Arnett, Wixom, MI (US); Steven E. Schulz, Torrance, CA (US); Bon Ho Bae, Torrance, CA (US); Silva Hiti, Redondo Beach, CA (US); Ronghui Li, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 447 days.

(21) Appl. No.: 13/183,318

(22) Filed: Jul. 14, 2011

(65) Prior Publication Data
US 2013/0015803 A1  Jan. 17, 2013

(51) Int. Cl.
H02P 7/00 (2006.01)
(52) U.S. Cl.
USPC .......................................... 318/432; 318/434
(58) Field of Classification Search
USPC ................ 318/432, 434, 727, 400.01, 400.2, 318/400.15, 400.26, 801
See application file for complete search history.

(56) References Cited

U.S. PATENT DOCUMENTS

| 5,144,216 A * | 9/1992 | De Doncker .................. 318/807 |
| 7,199,548 B2 * | 4/2007 | Inaguma et al. .............. 318/727 |
| 7,746,013 B2 * | 6/2010 | Fernengel et al. ........ 318/400.07 |
| 2005/0184689 A1 * | 8/2005 | Maslov et al. ................. 318/254 |
| 2011/0285342 A1 * | 11/2011 | Campbell et al. ............. 318/798 |

* cited by examiner

*Primary Examiner* — Rina Duda
(74) *Attorney, Agent, or Firm* — Ingrassia Fisher & Lorenz, P.C.

(57) ABSTRACT

Methods, system and apparatus are provided for reducing power loss in an electric motor drive system that includes an electric machine and an inverter module. A controller determines whether a torque command ($T_{cmd}$) is less than a minimum torque threshold ($T_{min}$) that is required to disable the inverter module, and if so, increments a counter and determines whether the torque command ($T_{cmd}$) remains less than the minimum torque threshold ($T_{min}$). When the torque command ($T_{cmd}$) remains less than the minimum torque threshold ($T_{min}$), the controller checks to determine whether a current count value (n) maintained at the counter is greater than a count threshold ($n_{th}$), and if so, the controller can generate a disable signal to disable switching within the inverter module.

20 Claims, 6 Drawing Sheets

METHODS, SYSTEMS AND APPARATUS FOR REDUCING POWER LOSS IN AN ELECTRIC MOTOR DRIVE SYSTEM

TECHNICAL FIELD

The present invention generally relates to electric motor drive systems, and more particularly relates to techniques for reducing power loss in electric motor drive systems.

BACKGROUND OF THE INVENTION

Electric motor drive systems, such as those used in hybrid and electric vehicles (HEVs), typically include an alternating current (AC) electric motor, a power converter and a direct current (DC) power source, such as a storage battery. The power converter typically includes an inverter module that coverts energy from the power source to drive the electric motor. Motor windings of the AC electric motor can be coupled to inverter sub-modules of the inverter module. Each inverter sub-module includes a pair of switches that switch in a complementary manner to perform a rapid switching function that convert the DC power to AC power. This AC power drives the AC electric motor, which in turn drives a shaft of HEV's drivetrain.

One drawback of many conventional electric motor drive systems is that the electronics (e.g., transistors such as IGBTs) in the inverter module are enabled and continue switching even when the commanded torque is zero (i.e., no torque is commanded from the AC electric motor). In other words, the switches of inverter module are active not only when torque is required from the motor, but also when torque is not and will continue switching even when no torque is required from the motor. This unnecessary switching can result in unnecessary power loss, which reduces efficiency of the system.

It would be desirable to provide improved methods, systems and apparatus for reducing electrical power losses in electric motor drive systems that include an electric machine and inverter module. It would also be desirable to improve efficiency of electrical motor drive systems, and to improve the usage of direct current (DC) power source(s). For instance, it would be desirable to provide methods, systems and apparatus for reducing or minimizing power loss due to unnecessary switching within an inverter module. Furthermore, other desirable features and characteristics of the present invention will become apparent from the subsequent detailed description and the appended claims, taken in conjunction with the accompanying drawings and the foregoing technical field and background.

SUMMARY OF THE INVENTION

Embodiments of the present invention relate to reducing power loss in an electric motor drive system. According to some of the disclosed embodiments, methods, system and apparatus are provided for reducing power loss in an electric motor drive system that includes an electric machine and an inverter module.

According to one embodiment, a controller determines whether a torque command ($T_{cmd}$) is less than a minimum torque threshold ($T_{min}$) that is required to disable the inverter module, and if so, increments a timer and determines whether the torque command ($T_{cmd}$) remains less than the minimum torque threshold ($T_{min}$). When the torque command ($T_{cmd}$) remains less than the minimum torque threshold ($T_{min}$), the controller checks to determine whether a current time value (t) maintained at the timer is greater than a wait time threshold ($t_{th}$) (after which the inverter module is to be disabled), and if so, the controller can generate a disable signal to disable switching within the inverter module.

In some implementations, such as when the electric machine is a permanent magnet machine, prior to incrementing the timer, the controller can also confirm that that a stator current command ($I_{scmnd}$) is less than the stator current threshold ($I_{sth}$), and that the back electromotive force ($B_{emf}$) value is less than the product of a margin (m) and a DC link voltage (Vdc). The controller can also confirm that that the stator current command ($I_{scmnd}$) remains less than the stator current threshold ($I_{sth}$), and that the back electromotive force ($B_{emf}$) value remains less than the product of the margin (m) and the DC link voltage ($V_{dc}$) before determining whether the current time value (t) maintained at the timer is greater than the wait time threshold ($t_{th}$).

According to another embodiment, a controller determines whether a torque command ($T_{cmd}$) is less than a minimum torque threshold ($T_{min}$) that is required to disable the inverter module, and if so, increments a counter and determines whether the torque command ($T_{cmd}$) remains less than the minimum torque threshold ($T_{min}$). When the torque command ($T_{cmd}$) remains less than the minimum torque threshold ($T_{min}$), the controller checks to determine whether a current count value (n) maintained at the counter is greater than a count threshold ($n_{th}$) (after which the inverter module is to be disabled), and if so, the controller can generate a disable signal to disable switching within the inverter module.

In some implementations, such as when the electric machine is a permanent magnet machine, prior to incrementing the counter, the controller can also confirm that that a stator current command ($I_{scmnd}$) is less than the stator current threshold ($I_{sth}$), and that the back electromotive force ($B_{emf}$) value is less than the product of a margin (m) and a DC link voltage ($V_{dc}$). The controller can also confirm that that the stator current command ($I_{scmnd}$) remains less than the stator current threshold ($I_{sth}$), and that the back electromotive force ($B_{emf}$) value remains less than the product of the margin (m) and the DC link voltage ($V_{dc}$) before determining whether the current count value (n) maintained at the counter is greater than the count threshold ($n_{th}$).

In accordance with the disclosed embodiments, gains in efficiency can be realized by disabling switching of in the inverter module when no torque is commanded from the motor. For example, when the electric machine is not being used (e.g., when no torque is required), switches in the inverter module can be disabled, thus eliminating the losses that would otherwise occur due to unnecessary switching within the inverter module (e.g., the switches and the gate drive circuit that drives the switches). This can help to improve system efficiency.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Overview

Embodiments of the present invention relate to reducing power loss in an electric motor drive system. The disclosed methods and apparatus can be implemented in operating environments such as a hybrid/electric vehicle (HEV). In the exemplary implementations which will now be described, the control techniques and technologies that will be described can be applied to an electric motor drive system that is implemented within a hybrid/electric vehicle (HEV). However, it will be appreciated by those skilled in the art that the same or similar techniques and technologies can be applied in the context of other electric motor drive systems in which it is desirable to reduce power and/or switching losses. In this regard, any of the concepts disclosed here can be applied generally to "vehicles," and as used herein, the term "vehicle" broadly refers to a non-living transport mechanism having an AC machine. As used herein, the term "AC machine" generally refers to "a device or apparatus that converts electrical energy to mechanical energy or vice versa." AC machines can generally be classified into synchronous AC machines and asynchronous AC machines. Synchronous AC machines can include permanent magnet machines and reluctance machines. Permanent magnet machines include surface mount permanent magnet machines (SMPMMs) and interior permanent magnet machines (IPMMs). Asynchronous AC machines include induction machines. Although an AC machine can be an AC motor (i.e., apparatus used to convert AC electrical energy power at its input to produce to mechanical energy or power), an AC machine is not limited to being an AC motor, but can also encompass generators that are used to convert mechanical energy or power at its prime mover into electrical AC energy or power at its output. Any of the machines can be an AC motor or an AC generator. An AC motor is an electric motor that is driven by an alternating current (AC), and can include a stator having coils supplied with alternating current to produce a rotating magnetic field, and a rotor attached to the output shaft that is given a torque by the rotating field. Depending on the type of rotor used, AC motors can be classified as synchronous or asynchronous. A synchronous AC motor rotates exactly at the supply frequency or a sub-multiple of the supply frequency. By contrast, an asynchronous (or induction) AC motor turns slightly slower than the supply frequency (or slightly faster in the case of regeneration mode). The magnetic field on the rotor of this motor is created by an induced current. In implementations where the AC machine is a three-phase permanent magnet synchronous AC motor this should be understood to encompass Interior Permanent Magnet Synchronous Motor (IPMSM), Surface Mount Permanent Magnet Synchronous Motor (SMPMSM) and Reluctance Motors.

Figure 1:
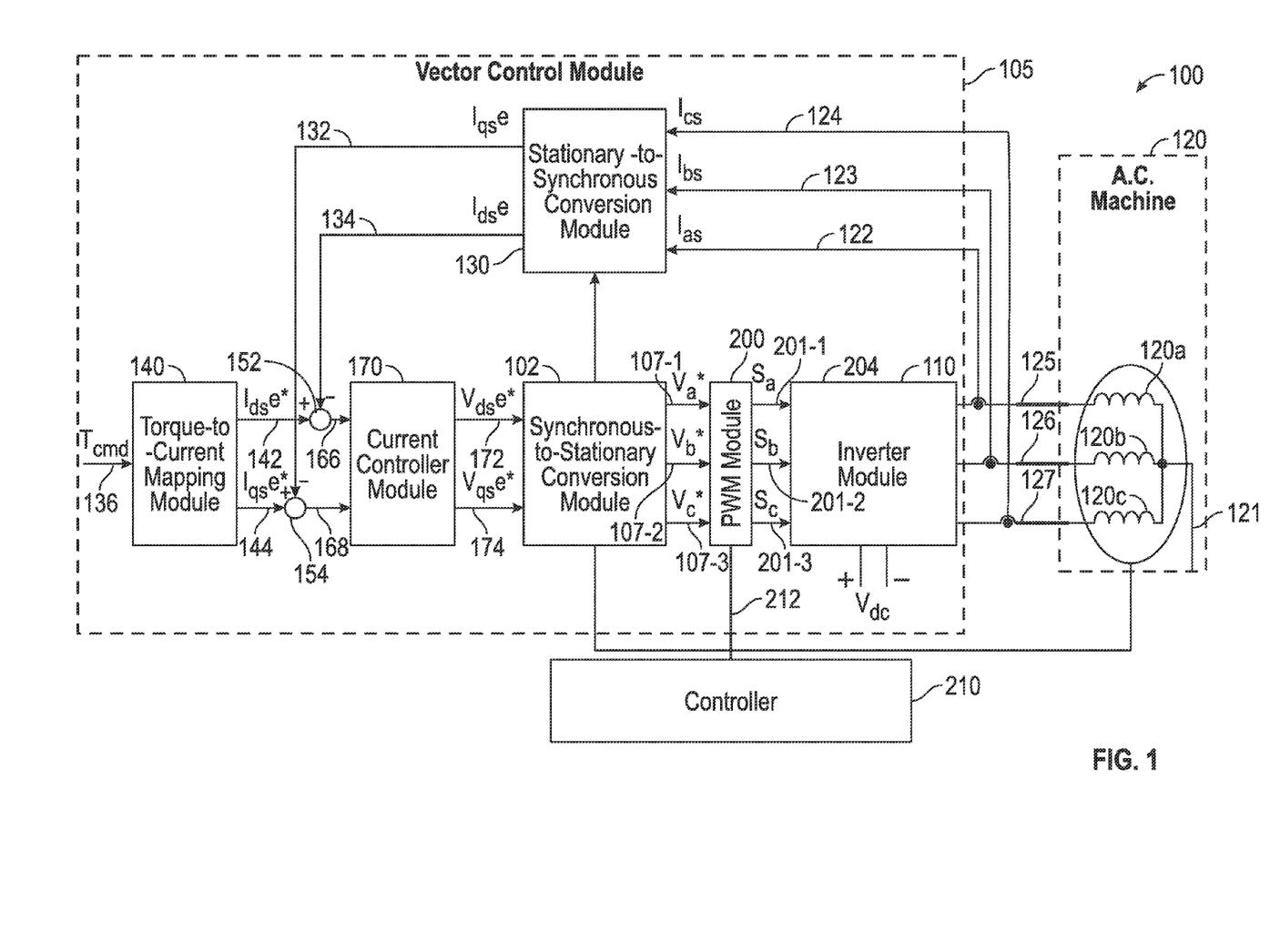
FIG. 1 is a block diagram of an electric motor drive system in accordance with some of the disclosed embodiments.

FIG. 1 is a block diagram of one conventional electric motor drive system 100 in which the disclosed embodiments can be implemented. The electric motor drive system 100 can be used to control torque in a hybrid/electric vehicle (HEV). In this one non-limiting embodiment, the electric motor drive system 100 includes a three-phase AC machine 120 coupled to a vector control module 105, and a controller 210. A inverter module 110 within the vector control module 105 is coupled to the three-phase AC machine 120 and is used to control the three-phase AC machine 120 so that the three-phase AC machine 120 can efficiently use a DC input voltage (Vdc) by adjusting current commands that control the three-phase AC machine 120. As will be describe in detail below, the controller 210 can generate signals to disable or enable switching within the inverter module 110 (e.g., to disable PWM switching by opening all the switches within the inverter module 110). Operational details regarding controller 210 will be described below with reference to FIGS. 3 and 4.

In the following description of one particular non-limiting implementation, the three-phase AC machine 120 is described as a three-phase AC powered motor 120. However, it should be appreciated that the illustrated embodiment is only one non-limiting example of the types of AC machines that the disclosed embodiments can be applied to, and that the disclosed embodiments are not limited to a three-phase system, and in other embodiments, the machine 120 can have other numbers of phases. In this one particular implementation, the electric machine 120 comprises a three-phase permanent-magnet synchronous machine (PMSM) 120; however, the disclosed embodiments can be applied to any type of AC machine including electric induction machines, etc.

The three-phase AC motor 120 is coupled to the three-phase inverter module 110 via three inverter poles and generates mechanical power (Torque×Speed) based on three-phase sinusoidal voltage signals received from the inverter module 110. Although not illustrated, the angular position of a rotor of the first three-phase AC motor 120 or "shaft position" can either be sensed using a position sensor, or, alternatively, when no speed/position sensor present in the motor 120, the rotor's angular position can estimated without actually using a position sensor via known "sensorless estimation" techniques.

The vector control module 105 receives a torque command (Tcmd) and generates three-phase voltage commands (Vap, Vbp, Vcp). In one implementation, some of the components or modules which may be used to implement the vector control module 105 can include a torque-to-current mapping module 140, summer junctions 152 and 154, a current-controller module 170, a synchronous-to-stationary conversion module 102, a PWM module 200, the inverter module 110, and a stationary-to-synchronous conversion module 130.

The torque-to-current mapping module 140 receives the torque command ($T_{cmd}$) and generates the d-axis current command (Ids_e*) 142 and the q-axis current command (Iqs_e*) 144. In particular, the torque-to-current mapping module 140 receives a torque command signal ($T_{cmd}$) 136 that is input from a user of the system 100, speed (ω) of the shaft (e.g., that is generated based on the derivative of the shaft position output), and the DC input voltage (Vdc) as inputs (and possibly a variety of other system parameters depending upon implementation). The torque-to-current mapping module 140 uses the inputs to map the torque command signal ($T_{cmd}$) 136 to a d-axis current command signal (Ids_e*) 142 and a q-axis current command signal (Iqs_e*) 144.

The stationary-to-synchronous conversion module 130 receives stator current (Ias, Ibs, Ics) 122, 123, 124 that are measured phase currents from motor 120 and a rotor position angle, and generates a feedback d-axis current signal (Ids_e) 132 and a feedback q-axis current signal (Iqs_e) 134, which are supplied to the summing junctions 152 and 154 to generate the current errors (Idserror_e and Iqserror_e) 166, 168. The output of the stationary-to-synchronous conversion module 130 can also be called synchronous reference frame current signals (Iqs_e, Ids_e) 132, 134. The process of stationary-to-synchronous conversion can be performed using Clarke and Park Transformations that are well-known in the art and for sake of brevity will not be described in detail.

The current mapping module 140 is coupled to summer junctions 152 and 154, which are coupled to a current controller module 170 and receive the output of the stationary-to-synchronous conversion module 130.

Upon receiving the d-axis current command signal (Ids_e*) 142 and the feedback d-axis current signal (Ids_e) 132, the summing junction 152 subtracts the feedback d-axis current signal (Ids_e) 132 from the d-axis current command signal (Ids_e*) 142 to generate a d-axis current error signal (Idserror_e) 166. Similarly, upon receiving the q-axis current command signal (Iqs_e*) 144 and the feedback q-axis current signal (Iqs_e) 134, the summing junction 154 subtracts the feedback q-axis current signal (Iqs_e) 134 from the q-axis current command signal (Iqs_e*) 144 to generate a q-axis current error signal (Iqserror_e) 168.

The current controller module 170 receives the d-axis current error signal (Idserror_e) 166 and the q-axis current error signal (Iqserror_e) 168 and uses these signals to generate a d-axis voltage command signal (Vds_e*) 172 and a q-axis voltage command signal (Vqs_e*) 174 that are used to control or regulate current. The process of current to voltage conversion can be implemented as a Proportional-Integral (PI) controller, which is well-known in the art and for sake of brevity will not be described in detail.

The synchronous-to-stationary conversion module 102 receives inputs from the current controller module 170 and generates outputs sent to the PWM module 200. In particular, the synchronous-to-stationary conversion module 102 receives the d-axis voltage command signal (Vds_e*) 172 and the q-axis voltage command signal (Vqs_e*) 174 and the rotor position angle, and based on these signals, generates a three-phase sinusoidal voltage command (Va*) 107-1, a three-phase sinusoidal voltage command (Vb*) 107-2, and a three-phase sinusoidal voltage command (Vc*) 107-3. The process of synchronous-to-stationary conversion is done using inverse Clarke and Park Transformations that are well-known in the art and for sake of brevity will not be described in detail.

The PWM module 200 is used for the control of pulse width modulation (PWM). As described above, the PWM module 200 receives the three-phase sinusoidal voltage commands (Va*) 107-1, (Vb*) 107-2, (Vc*) 107-3 from the synchronous-to-stationary conversion module 102, and uses these signals to generate switching vector signals (Sa) 201-1, (Sb) 201-2, (Sc) 201-3, which it provides to inverter module 110. The particular PWM modulation algorithm implemented in the PWM module 200 can be any known modulation algorithm.

When the PWM module 200 is enabled, the switching vector signals (Sa . . . Sc) 201 can be provided to the inverter module 110 to control the switching states of switches (described below with reference to FIG. 2) in inverter module 110 to generate three phase voltage commands. The inverter module 110 receives the DC input voltage (Vdc) and switching vector signals (Sa . . . Sc) 201, and uses them to generate alternating current (AC) waveforms called three-phase voltage signals (Vap . . . Vcp) 125-127 at inverter poles that drive the three-phase AC machine 120 at varying speeds.

The permanent magnet synchronous motor 120 receives the three-phase voltage signals (Vap . . . Vcp) 125-127 generated by the inverter module 110, and generates the commanded torque ($T_{cmd}$).

The stator currents 122-124 (Ias, Ibs and Ics) are sensed, sampled and provided to the stationary-to-synchronous conversion module 130. Although not illustrated in FIG. 1, the system 100 may also include a gear coupled to and driven by the three-phase AC motor 120 shaft and the three-phase AC machine 120 shaft.

Prior to describing operation details of the controller 210 and the inverter module 110, a more detailed description of one possible implementation of a three-phase voltage source inverter 110 will be provided including how it is connected to the three phase machine 120.

Figure 2:
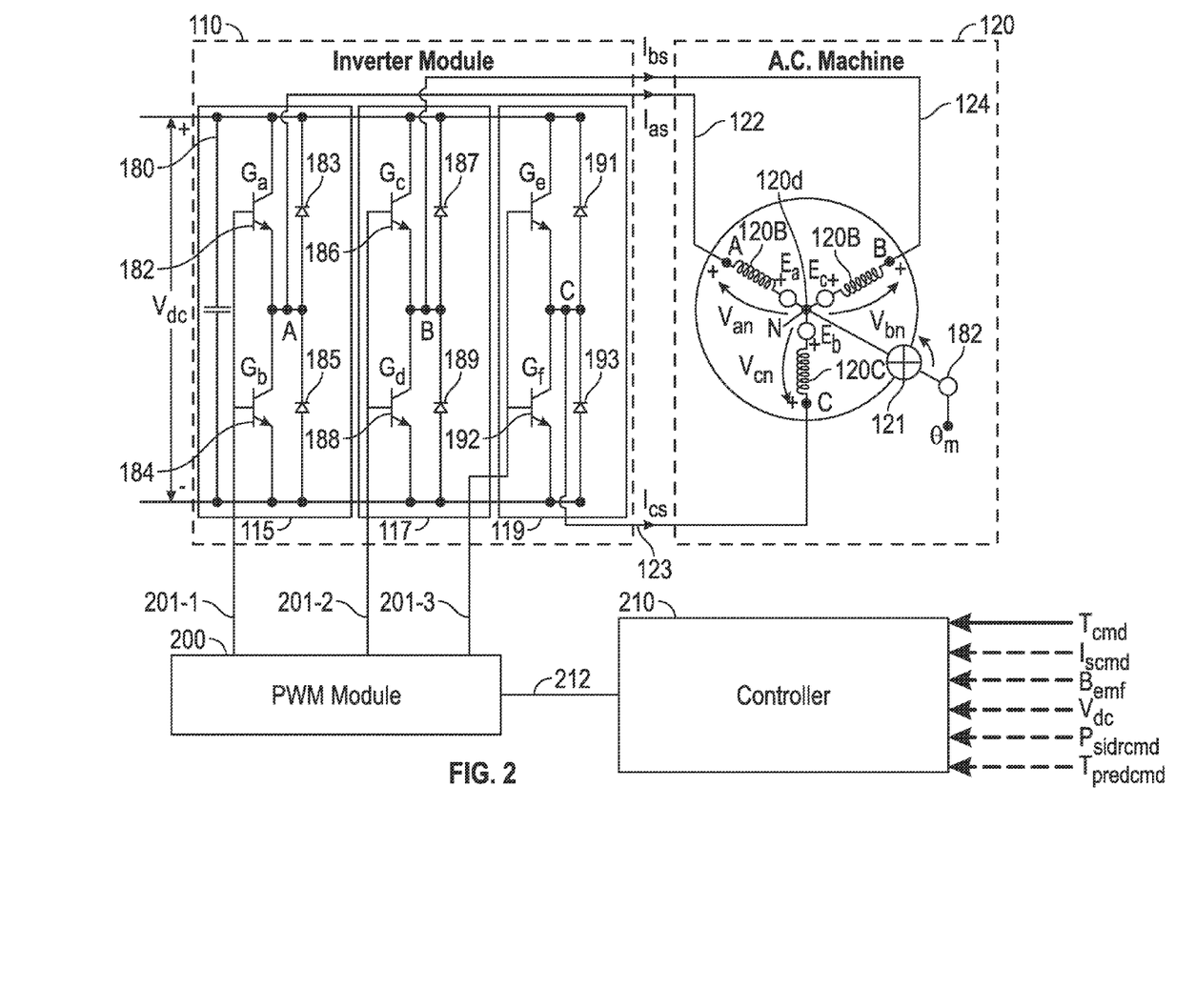
FIG. 2 is a block diagram of a portion of the electric motor drive system of FIG. 1 in one implementation that includes a three-phase voltage source inverter connected to a three phase machine.

FIG. 2 is a block diagram of a portion of an electric motor drive system including a three-phase inverter module 110 connected to a three phase machine 120. FIG. 2 illustrates a particular type of three-phase AC machine 120 that can be referred to as a star-connected (or Y-connected) three-phase electric machine 120, and a three-phase inverter module 110 that can be referred to as a full-wave bridge inverter 110. It should be noted that the three-phase voltage source inverter 110 and the three phase AC machine 120 in FIG. 1 are not limited to this implementation; rather, FIG. 2 is merely one example of how the three-phase voltage source inverter module 110 and the three phase machine 120 in FIG. 1 can be implemented in one exemplary implementation.

The three-phase AC machine 120 has three stator or motor windings 120A, 120B, 120C connected in a wye-configuration between motor terminals A, B, and C, and the three-phase inverter module 110 that includes a capacitor 180 and three inverter sub-modules 115, 117, 119. In this embodiment, in phase A the inverter sub-module 115 is coupled to motor winding 120A, in phase B the inverter sub-module 117 is coupled to motor winding 120B, and in phase C the inverter sub-module 119 is coupled to motor winding 120C. The motor windings A, B, C (120A, 120B, 120C) are coupled together at a neutral point (N) 120D. The current into motor winding A 120A flows out motor windings B 120B and C 120C, the current into motor winding B 120B flows out motor windings A 120A and C 120C, and the current into motor winding C 120C flows out motor windings A 120A and B 120B.

Phase currents (i.e., first stator current (Ias) 122, second stator current (Ibs) 123, and third stator current (Ics) 124) flow through respective stator windings 120A, 120B, and 120C. The phase to neutral voltages across each of the stator windings 120A-120C are respectively designated as $V_{an}$, $V_{bn}$, $V_{cn}$, with the back EMF voltages generated in each of the stator windings 120A-120C respectively shown as the voltages $E_a$, $E_b$, and $E_c$ represented by ideal voltage sources each respectively shown connected in series with stator windings 120A-120C. These back EMF voltages $E_a$, $E_b$, and $E_c$ are the voltages induced in the respective stator windings 120A-120C by the rotation of permanent magnet rotor. Although not shown, the machine 120 is coupled to a drive shaft.

The full-wave bridge inverter 110 includes a capacitor 180, a first inverter sub-module 115 comprising a dual switch 182/183, 184/185, a second inverter sub-module 117 comprising a dual switch 186/187, 188/189, and a third inverter sub-module 119 comprising a dual switch 190/191, 192/193. Electronics within the full-wave bridge inverter 110 include six solid state switching devices 182, 184, 186, 188, 190, 192 and six diodes 183, 185, 187, 189, 191, 193 to appropriately switch DC input voltage ($V_{dc}$) and provide three-phase energization of the stator windings 120A, 120B, 120C of the three-phase AC machine 120.

The PWM module 200 generates switching signals (Sa) 201-1, (Sb) 201-2, (Sc) 201-3 for controlling the switching of solid state switching devices 182, 184, 186, 188, 190, 192 within the inverter sub-modules 115, 117, 119. By providing appropriate switching signals (Sa) 201-1, (Sb) 201-2, (Sc) 201-3 to the individual inverter sub-modules 115, 117, 119, the PWM module 200 controls switching of solid state switching devices 182, 184, 186, 188, 190, 192 within the inverter sub-modules 115, 117, 119 and thereby controls the outputs of the inverter sub-modules 115, 117, 119 that are provided to motor windings 120A, 120B, 120C, respectively. The first stator current (Ias) 122, the second stator current (Ibs) 123, and the third stator current (Ics) 124 that are generated by the inverter sub-modules 115, 117, 119 of the three-phase inverter module 110 are provided to motor windings 120A, 120B, 120C. The voltages labeled as $V_{an}$, $V_{bn}$, $V_{cn}$, $E_a$, $E_b$, and $E_c$ and the voltage at node N fluctuate over time depending on the open/close state of switches 182, 184, 186, 188, 190, 192 in the inverter sub-modules 115, 117, 119 of the inverter module 110, as will be described below.

In accordance with the disclosed embodiments, the controller 210 can generate disable or enable signals 212 to disable or enable switching within the inverter module 110. For example, controller 210 can receive signals including a measured DC link or input voltage ($V_{dc}$), torque command (Tcmd) signals from the machine 120, stator current command ($I_{scmnd}$) signals or alternatively stator current command signals (Ids_e*, Iqs_e*) 142, 144 from the current mapping module 140, which are used to compute $I_{scmd}$, back EMF (Bemf) signals which may be computed from the stator current command signals (Ids_e*, Iqs_e*) 142, 144, minimum flux preparation command (Psidrpreflux) signals, predicted torque command ($T_{Predcmd}$) signals and other operating signals. Based on these signals, the controller 210 can generate control signals 212 that are provided to the PWM module 200 to either enable or disable the PWM module 200, and thus effectively enable or disable the inverter module 110. In one embodiment, the controller 210 can generate either: an enable signal that enables the PMW module 200 so that it generates switching signals (Sa) 201-1, (Sb) 201-2, (Sc) 201-3 and thereby enables switching of the switches 182, 184, 186, 188, 190, 192 in the inverter module 110, or a disable signal that disables the PMW module 200 so that it does not generate switching signals (Sa) 201-1, (Sb) 201-2, (Sc) 201-3 and thereby disables switching of the switches 182, 184, 186, 188, 190, 192 in the inverter module 110. By disabling switching of switches 182, 184, 186, 188, 190, 192 in the inverter module 110 when no torque is commanded from the electric machine 120, gains in efficiency can be realized. For example, when the electric machine 120 is not being used (e.g., when no torque is commanded or otherwise required), switches 182, 184, 186, 188, 190, 192 in the inverter module 110 can effectively be disabled, thus eliminating the losses that would otherwise occur due to unnecessary switching within the inverter module 110.

In one implementation where the machine 120 is an electric induction machine operating in an optimal efficiency control mode, in which the current commands are set to the minimal values for the torque command, the controller 210 can determine whether a computed torque command ($T_{cmd}$) is less than a minimum torque threshold ($T_{min}$) that is required to disable the inverter module 110, and if so, starts a timer (or alternatively increments a counter) and determines or confirms that the computed torque command ($T_{cmd}$) remains less than the minimum torque threshold ($T_{min}$) while the timer continues running (or alternatively while the counter continues counting). So long as the computed torque command ($T_{cmd}$) remains less than the minimum torque threshold ($T_{min}$), the controller checks to determine whether a current time value (t) maintained at the timer is greater than a wait time threshold ($t_{th}$) (or alternatively checks to determine whether a current count value (n) maintained at the counter is greater than a count threshold ($n_{th}$)), and if so, the controller 210 can generate a disable signal 212 to disable switching within the inverter module 110. In one alternative implementation where the machine 120 is an electric induction machine operating in a fast torque dynamics control mode, in which the controller receives the predicted torque command and produces the flux for the predicted torque in advance even if the current torque command ($T_{cmd}$) is zero, the controller 210 can determine whether both a computed torque command ($T_{cmd}$) and a predicted torque command ($T_{predictedcmd}$)) are less than the minimum torque threshold ($T_{min}$) prior to starting a timer (or alternatively incrementing a counter).

In another alternative implementation where the machine 120 is an electric induction machine operating in a fast torque dynamics control mode, in which minimum flux preparation command (Psidrpreflux) signals is given in advance and the minimum flux is generated in the rotor even if the present torque command ($T_{cmd}$) is zero, the controller 210 determines whether the computed torque command ($T_{cmd}$) is less than the minimum torque threshold ($T_{min}$), the controller may optionally first confirm that a minimum flux preparation command (Psidrpreflux) signals is less than a minimum torque threshold (Psidrmin).

In another implementation where the machine 120 is an electric permanent magnet machine, the controller 210 can determine whether a computed torque command ($T_{cmd}$) is less than a minimum torque threshold ($T_{min}$) that is required to disable the inverter module 110, confirm that a stator current command ($I_{scmnd}$) is less than the stator current threshold ($I_{sth}$), and confirm that the computed back electromotive force ($B_{emf}$) value is less than the product of a margin (m) and a measured DC link voltage ($V_{dc}$). In one implementation, the stator current command ($I_{scmnd}$) is a commanded value that is computed by the controller based on the d-axis current command signal (Ids_e*) 142 and the q-axis current command signal (Iqs_e*) 144. In one particular implementation, the total stator current command ($I_{scmnd}$) amplitude is equal to $\sqrt{(Ids\_e^*)^2 + (Iqs\_e^*)^2}$. A commanded value is less sensitive to measurement noise (than a measured value) and works well when current regulators function as intended and force the measured phase current to be substantially equal to the commanded value of the stator current command ($I_{scmnd}$). In other implementations, the stator current command ($I_{scmnd}$) can be a measured value that is based on (or that is determined based on) one or more of the measured phase currents. If all of these conditions are satisfied, the controller 210 starts a timer (or alternatively increments a counter). The controller 210 eventually determines whether a current time value (t) maintained at the timer is greater than a wait time threshold ($t_{th}$) (or alternatively checks to determine whether a current count value (n) maintained at the counter is greater than a count threshold ($n_{th}$)), and if so and the other conditions continue to be satisfied (i.e., the computed torque command ($T_{cmd}$) continues to be less than a minimum torque threshold ($T_{min}$), the stator current command ($I_{scmnd}$) continues to be less than the stator current threshold ($I_{sth}$), and the computed back electromotive force ($B_{emf}$) value continues to be less than the product of the margin (m) and the measured DC link voltage ($V_{dc}$)), then the controller 210 can generate a disable signal 212 to disable switching within the inverter module 110.

Further operational details regarding controller 210 will be described below with reference to FIGS. 3 and 4.

Figure 3:
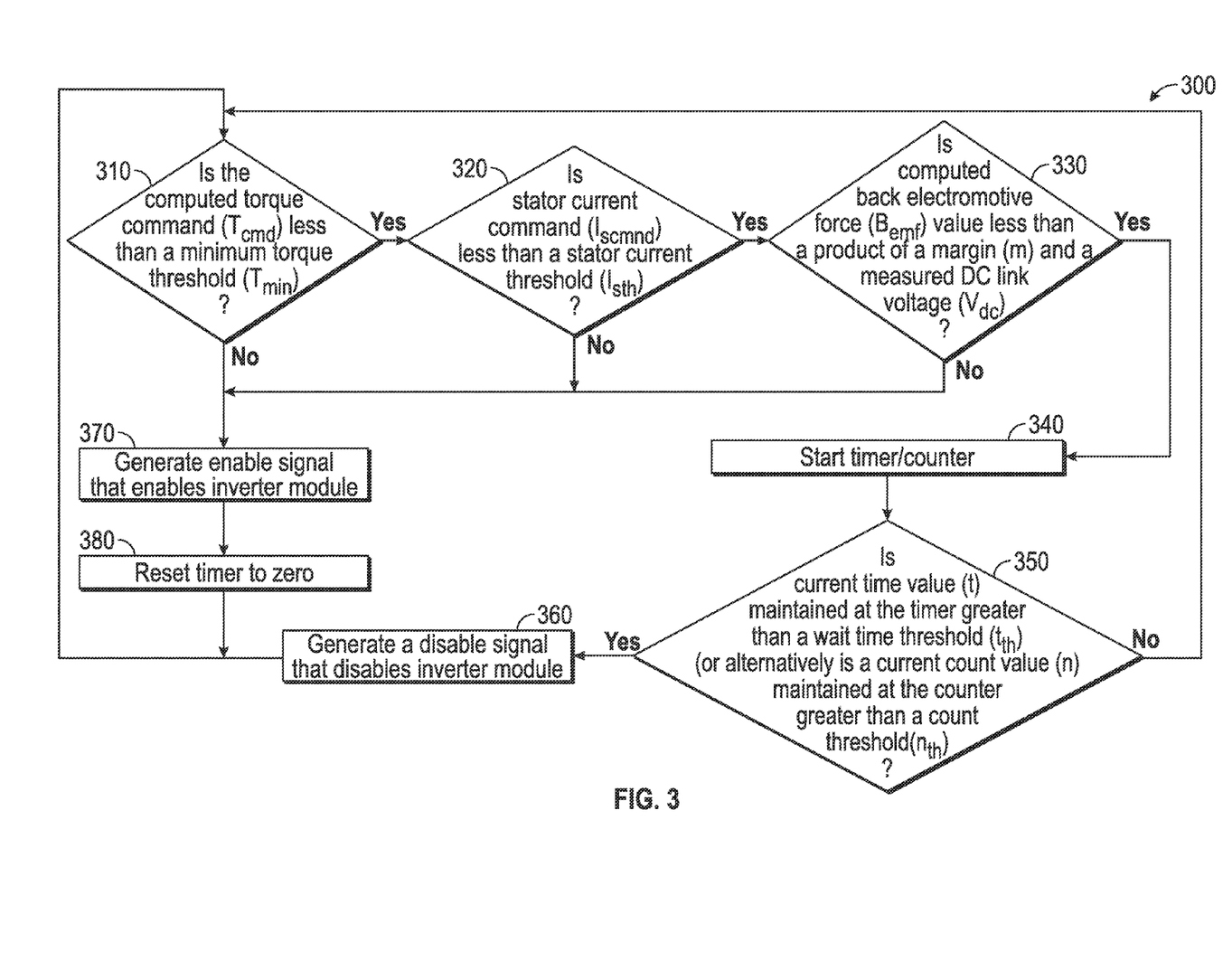
FIG. 3 is a flow chart illustrating a method for reducing power loss in an electric motor drive system in accordance with some of the disclosed embodiments.

FIG. 3 is a flow chart illustrating a method 300 for reducing power loss in an electric motor drive system in accordance with some of the disclosed embodiments. The method 300 of FIG. 3 can be applied, for example, to an electric motor drive system that includes a controller 210 that is coupled to a permanent magnet electric machine 120 and to an inverter module 110 that is also coupled to the permanent magnet electric machine 120.

The method 300 begins at 310, where the controller 210 determines whether a computed torque command ($T_{cmd}$) is less than a minimum torque threshold ($T_{min}$) that is required to disable switching of electronics in the inverter module 110. In some scenarios, a negligible value of the computed torque command ($T_{cmd}$) will be computed, for example, due to resolution of a signal measured on the supply bus even though no actual torque is being commanded (e.g., a negligible value is computed even though the actual Tcmd is zero). In one implementation, the computed torque command ($T_{cmd}$) is an absolute value, and the minimum torque threshold ($T_{min}$) is set to a value (as opposed to zero) to define a calibratable deadband about zero for which the computed torque command ($T_{cmd}$) is negligible and can be interpreted as zero.

When the controller 210 determines at 310 that the computed torque command ($T_{cmd}$) is greater than or equal to the minimum torque threshold ($T_{min}$), then the method 300 proceeds to 370, where the controller 210 generates an enable signal that allows switching of electronics 182-193 in the inverter module 110. In a scenario where the electronics 182-193 are already switching, the controller 210 generates a signal that allows or permits switching of the electronics in the inverter module 110 to continue. By contrast, in a scenario where the electronics 182-193 are disabled and not currently switching, the controller 210 generates an enable signal 212 that enables switching of the electronics 182-193 in the inverter module 110. The method 300 then proceeds to 380, where the controller 210 resets a timer to zero, and the method 300 then returns to 310.

When the controller 210 determines at 310 that the computed torque command ($T_{cmd}$) is less than the minimum torque threshold ($T_{min}$), the method 300 proceeds to 320, where the controller 210 determines whether a stator current command ($I_{scmnd}$) is less than a stator current threshold ($I_{sth}$). The stator current command ($I_{scmnd}$) can be any one of the stator currents 122-124 or determined based on one or more of the stator currents 122-124. The stator current threshold ($I_{sth}$) is calibratable value that can be used to determine whether or not any stator current flowing in the permanent magnet electric machine 120 or whether the stator current command ($I_{scmnd}$) is so small that it is negligible and indicative of a false condition, in which case it can be interpreted as meaning that the stator current is not actually flowing.

When the controller 210 determines at 320 that the current command ($I_{scmnd}$) is not less than the stator current threshold ($I_{sth}$), then the method 300 proceeds to 370, and continues as described above.

When the controller 210 determines at 320 that the stator current command ($I_{scmnd}$) is less than the stator current threshold ($I_{sth}$), the method 300 proceeds to 330, where the controller 210 determines whether a computed back electromotive force ($B_{emf}$) value is less than a product of a margin (m) and a measured DC link voltage ($V_{dc}$). As used herein, the term "DC link voltage" is used interchangeably with the term "DC input voltage." The computed back electromotive force ($B_{emf}$) value can be computed from known machine parameters and measured speed, and represents the back EMF voltages $E_a$, $E_b$, and $E_c$ in FIG. 2 that are induced in the respective stator windings 120A-120C by the rotation of permanent magnet rotor. In general, the back electromotive force ($B_{emf}$) value is proportional to motor speed, and may be computed as the product of motor speed and a coefficient that converts revolutions per minute (RPM) to voltage. In one implementation for a permanent magnet machine, the back electromotive force may be computed as the product of the motor speed and the stator flux linkage due to the permanent magnet. The margin (m) is a calibratable margin greater than zero and less than one that is set to ensure that the computed back electromotive force ($B_{emf}$) value is less than a percentage of the measured DC link voltage ($V_{dc}$) so that the back electromotive force ($B_{emf}$) of the permanent magnet electric machine 120 will not inadvertently cause the electric motor drive system to operate in an uncontrolled generator mode and allow current to flow from the permanent magnet electric machine 120 to the DC power source. If the line-to-line back EMF in the permanent magnet electric machine 120 exceeds the DC link voltage, then the anti-parallel diodes in the inverter module 110 will conduct, allowing current to flow in the permanent magnet electric machine 120 and back to the DC power source. This results in unwanted braking torque and uncontrolled energy into the DC power source.

When the controller 210 determines at 330 that the computed back electromotive force ($B_{emf}$) value is not less than the product of the margin (m) and the measured DC link voltage ($V_{dc}$), the method 300 proceeds to 370, where the controller 210 generates an enable signal 212 that allows switching of electronics in the inverter module 110, and the method 300 continues as described above.

When the controller 210 determines at 330 that the computed back electromotive force ($B_{emf}$) value is less than the product of the margin (m) and the measured DC link voltage ($V_{dc}$), the method 300 proceeds to 340, where the controller 210 starts a timer that runs for a time (t) (or alternatively increments a counter that maintains a count (n)).

The method 300 proceeds to 350. At 350, the controller 210 determines whether a current time value (t) maintained at the timer is greater than a wait time threshold ($t_{th}$) (or alternatively determines whether a current count value (n) maintained at the counter is greater than a count threshold ($n_{th}$)). The wait time threshold ($t_{th}$) is a time period that the controller 210 waits (after starting the timer) to ensure that the electric motor drive system has stabilized before determining whether electronics 182-193 in the inverter module 110 should be disabled. Similarly, count threshold ($t_{th}$) is a number of times that the controller 210 waits (after incrementing the counter the first time) to ensure that the electric motor drive system has stabilized before determining whether electronics 182-193 in the inverter module 110 should be disabled.

When the controller 210 determines at 350 that the current time value (t) maintained at the timer is greater than the wait time threshold ($t_{th}$) (or alternatively determines whether the current count value (n) maintained at the counter is greater than the count threshold ($n_{th}$)), the method 300 proceeds to 360, and then loops back to 310, where the processing repeats.

Whenever the controller 210 determines that either: (1) the computed torque command ($T_{cmd}$) is greater than or equal to the minimum torque threshold ($T_{min}$) at 310; (2) the current command ($I_{scmnd}$) is greater than or equal to the stator current threshold ($I_{sth}$) at 320; or (3) the computed back electromotive force ($B_{emf}$) value is greater than or equal to the product of the margin (m) and the measured DC link voltage ($V_{dc}$) at 330, the method 300 proceeds to 370 as described above.

By contrast, when the controller 210 determines (1) that the computed torque command ($T_{cmd}$) is less than the minimum torque threshold ($T_{min}$) at 310; (2) that the current command ($I_{scmnd}$) is less than the stator current threshold ($I_{sth}$) at 320; and (3) that the computed back electromotive force ($B_{emf}$) value is less than the product of the margin (m) and the measured DC link voltage ($V_{dc}$) at 330, then the method 300 proceeds to 340 where, where the controller 210 continues to let the timer run (or alternatively increments a counter that maintains a count (n), and then proceeds to 350, where the controller 210 again determines whether the current time value (t) maintained at the timer is greater than or equal to the wait time threshold ($t_{th}$) (or alternatively determines whether the current count value (n) maintained at the counter is greater than or equal to the count threshold ($n_{th}$)).

When the controller 210 determines at 350 that the current time value (t) maintained at the timer is less than the wait time threshold ($t_{th}$) (or alternatively that the current count value (n) maintained at the counter is less than the count threshold ($n_{th}$)), then the method 300 loops back to 310, where the method 300 continues as described above.

By contrast, when the controller 210 determines at 350 that the current time value (t) is greater than or equal to the wait time threshold ($t_{th}$) (or alternatively that the current count value (n) maintained at the counter is greater than or equal to the count threshold ($n_{th}$)), the method proceeds to 360, where the controller 210 generates a disable signal 212 that disables switching of electronics 182-193 in the inverter module 110 (e.g., forces all of the switches 182, 184, 186, 188, 190, 192 into an off state). The method 300 then returns to 310.

Figure 4:
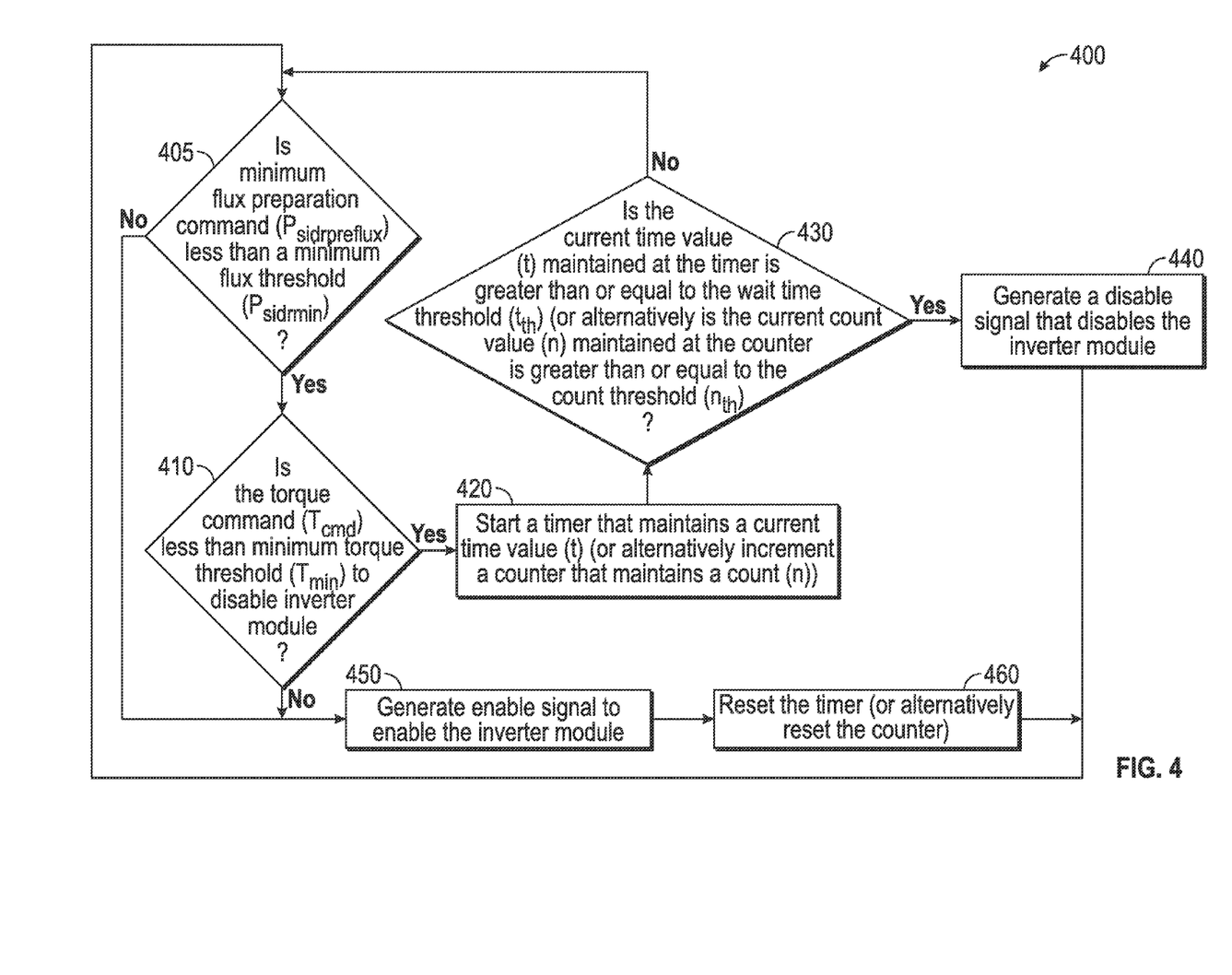
FIG. 4 is a flow chart illustrating a method for reducing power loss in an electric motor drive system in accordance with some of the other disclosed embodiments.

FIG. 4 is a flow chart illustrating a method 400 for reducing power loss in an electric motor drive system in accordance with some of the other disclosed embodiments. The method 400 of FIG. 4 can be applied, for example, to an electric motor drive system that includes a controller 210 that is coupled to an electric induction machine 120 and to an inverter module 110 that is also coupled to the electric induction machine 120.

Method 400 may skip 405 when the machine is operating in an optimal efficiency control mode, but is performed when operating in a fast torque dynamics mode. To explain further, when operating in the optimal efficiency control mode the torque-current mapping module 140 produces or computes the d-axis current command signal (Ids_e*) 142 and the q-axis current command signal (Iqs_e*) 144 based on the torque command (Tcmd). In most cases, the optimal d-axis current command signal (Ids_e*) 142 and the optimal q-axis current command signal (Iqs_e*) 144 are the combination of Id and Iq that can produce the commanded torque (Tcmd) with minimum current magnitude ($\sqrt{(Id)^2+(Iq)^2}$). It is inherent characteristics in induction motor that the flux in rotor is generated from the d-axis current command signal (Ids_e*) 142 with some delay, which is called rotor time constant. In an induction motor, d-axis current is also called as flux-axis current because it produces the flux in rotor. In optimal efficiency control mode, when the torque command (Tcmd) is zero and suddenly changes, the time delay for rotor flux build-up causes the delay in torque response. To improve the torque dynamics, a dynamic torque control mode is used to prepare the flux even if the torque command (Tcmd) is zero. In the torque dynamics control mode, a flux preparation command (Psidrpreflux) will generate the d-axis current (Ids_e*) command to build up the flux to produce a commanded minimum flux even when the torque command (Tcmd) is zero. Thus, when operating in the torque dynamics control mode, an additional condition needs to be evaluated prior to the controller 210 checking to determine if the torque command (Tcmd) is less than minimum torque threshold (Tmin) at 410. In the additional check performed at 405, the controller 210 determines whether a minimum flux preparation command (Psidrpreflux) is less than a minimum flux threshold (Psidrmin) When the controller 210 determines, at 405, that the minimum flux preparation command (Psidrpreflux) is not less than the minimum flux threshold (Psidrmin), the method 400 proceeds to 450. When the controller 210 determines, at 405, that the minimum flux preparation command (Psidrpreflux) is less than the minimum flux threshold (Psidrmin), the method 400 proceeds to 410.

Figure 5:
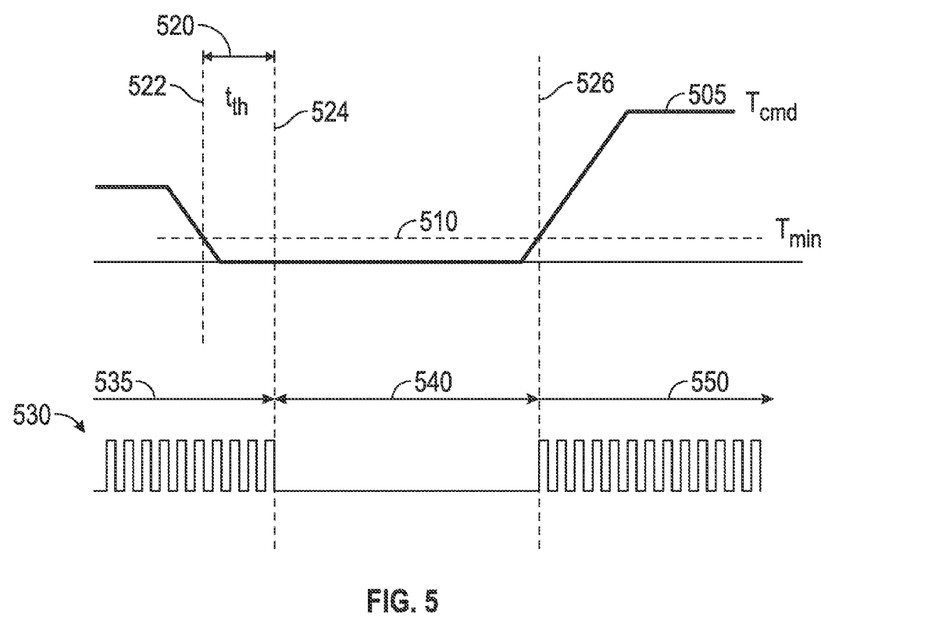
FIG. 5 is a set of exemplary plots that illustrate a computed torque command ($T_{cmd}$), a minimum torque threshold ($T_{min}$), a wait time threshold ($t_{th}$), and a switching vector signal that can be selectively provided to switches of an inverter module.

At 410, the controller 210 determines whether a torque command ($T_{cmd}$) is less than a minimum torque threshold ($T_{min}$) that is required to disable switching of electronics 182-193 in the inverter module 110. In one implementation, for an induction machine, the computed torque command ($T_{cmd}$) can be a maximum of an absolute value of an immediate torque command for torque production and an absolute value of a predicted torque command for preflux. FIG. 5 is a set of exemplary plots that illustrate a computed torque command ($T_{cmd}$), a minimum torque threshold ($T_{min}$), a wait time threshold ($t_{th}$), and a switching vector signal that can be selectively provided to switches of an inverter module. In FIG. 5, plot 505 illustrates an example of a computed torque command ($T_{cmd}$), and line 510 illustrates an example of the minimum torque threshold ($T_{min}$). The value of the minimum torque threshold ($T_{min}$) at 410 can be the same or different than the one that is described with reference to FIG. 3.

When the controller 210 determines at 410 that the computed torque command ($T_{cmd}$) is greater (or "not less") than the minimum torque threshold ($T_{min}$), the method 400 proceeds to 450, where the controller 210 generates an enable signal that allows switching of electronics 182-193 in the inverter module 110, and the method 400 then proceeds to 460, where the controller 210 resets the timer (or alternatively resets the counter), and the method 400 then returns to 410. For instance, in FIG. 5, plot 530 illustrates an example of a switching vector signal (e.g., any of signals (Sa) 201-1, (Sb) 201-2, (Sc) 201-3) that can be provided to inverter module 110. During a first period 535 and the third period 550, switching vector signal is provided to the inverter module 110 so that switches in the inverter module 110 will be allowed to switch, whereas during a second time period 540 the switching vector signal is disabled so that it is not provided to the inverter module 110 so that switches in the inverter module 110 will not be allowed to switch.

When the controller 210 determines at 410 that the computed torque command ($T_{cmd}$) is less than the minimum torque threshold ($T_{min}$), the method 400 proceeds to 420, where the controller 210 starts a timer that maintains a current time value (t) (or alternatively increments a counter that maintains a count (n))). In some implementations, after 420, although not illustrated, the controller 210 can perform other processing tasks (not illustrated in FIG. 4).

The method 400 proceeds to 430, where the controller 210 determines whether the current time value (t) maintained at the timer is greater than or equal to the wait time threshold ($t_{th}$) (or alternatively determines whether the current count value (n) maintained at the counter is greater than or equal to the count threshold ($n_{th}$)). In some implementations, the wait time threshold ($t_{th}$) can be set to a value greater than four times a time constant of the rotor to make sure that the rotor flux decayed.

When the controller 210 determines at 430 that the current time value (t) maintained at the timer is less than the wait time threshold ($t_{th}$) (or alternatively determines that the current count value (n) maintained at the counter is less than the count threshold ($n_{th}$)), the method 400 loops back to 405, and the method 400 continues as described above.

When the controller 210 determines at 430 that the current time value (t) maintained at the timer is greater than (or equal to) the wait time threshold ($t_{th}$) (or alternatively determines that the current count value (n) maintained at the counter is greater than or equal to the count threshold ($n_{th}$)), the method 400 proceeds to 440, where the controller 210 generates a disable signal 212 that disables switching of electronics 182-193 in the inverter module 110. The method 400 then returns to 410.

For instance, in FIG. 5, when the computed torque command ($T_{cmd}$) 505 falls below the minimum torque threshold ($T_{min}$) 510, the timer starts at time 522. While the timer continues to run, the controller continues to monitor the computed torque command ($T_{cmd}$) 505 to ensure that it remains below the minimum torque threshold ($T_{min}$) 510, and after confirming that this is true, the controller 210 determines whether a current time value (t) (along line 520) of the timer is greater than a wait time threshold ($t_{th}$) 524.

During the first period 535, because the current time value (t) (along line 520) of the timer is still less than the wait time threshold ($t_{th}$) 524, the switching vector signal 530 continues to be provided to the inverter module 110 (so that switches in the inverter module 110 will be allowed to switch).

However, when the current time value (t) maintained at the timer is greater than or equal to the wait time threshold ($t_{th}$) 524 (and assuming that the computed torque command ($T_{cmd}$) 505 has continuously remained below the minimum torque threshold ($T_{min}$) 510), then the controller generates a disable signal so that the switching vector signal 530 is disabled (during period 540 of FIG. 5). As a result, the switches in the inverter module 110 are effectively disabled and will not switch. When the computed torque command ($T_{cmd}$) 505 increases so that it is above the minimum torque threshold ($T_{min}$) 510 (at time 526 on FIG. 5 or during the third period 550), the controller generates an enable signal to enable switching and to allow the switching vector signal 530 to be provided to the inverter module 110 so that switches in the inverter module 110 will again be allowed to switch.

Figure 6:
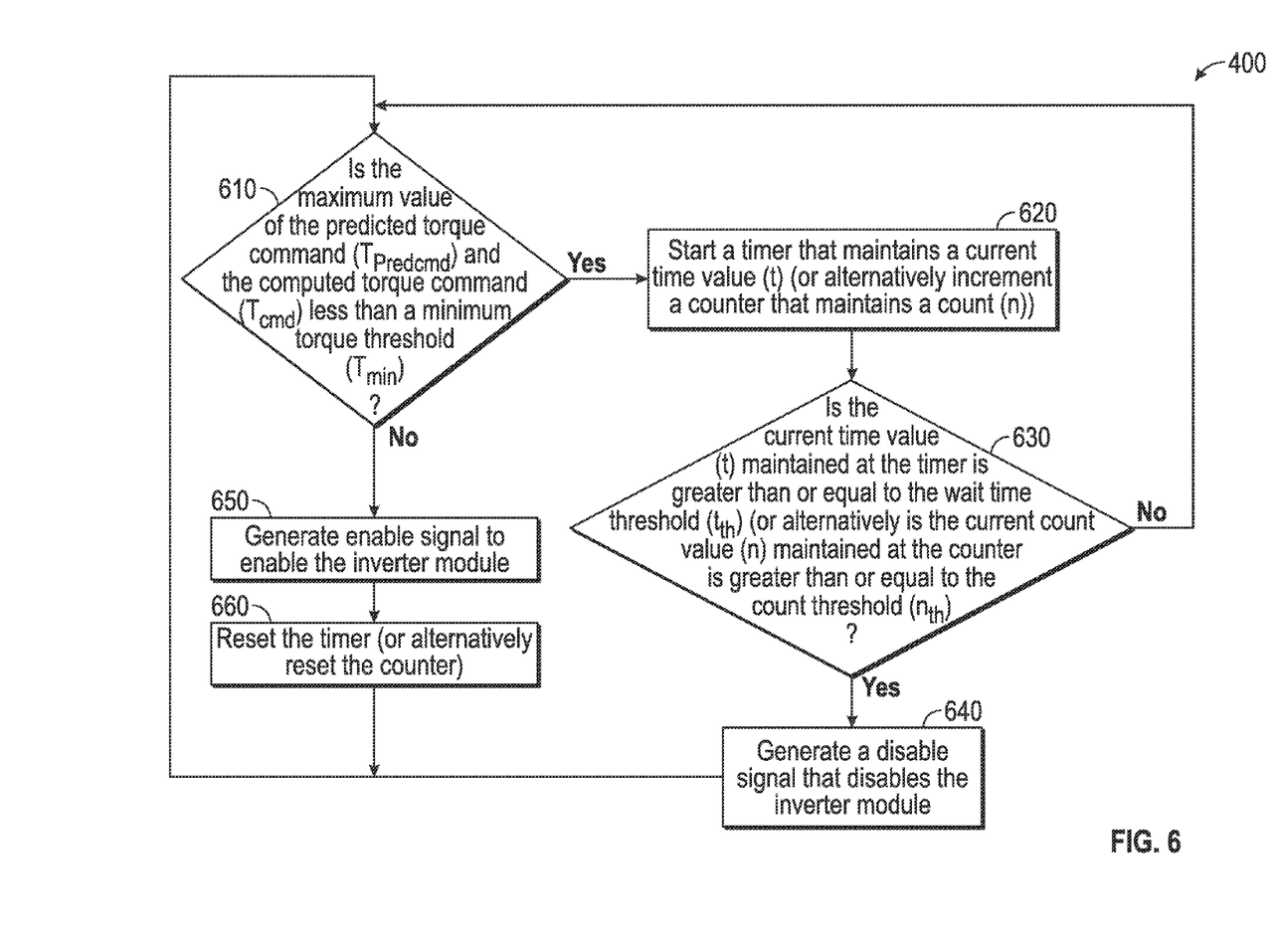
FIG. 6 is a flow chart illustrating a method for reducing power loss in an electric motor drive system in accordance with some of the other disclosed embodiments.

FIG. 6 is a flow chart illustrating a method 600 for reducing power loss in an electric motor drive system in accordance with some of the other disclosed embodiments. The method 600 of FIG. 6, like that in FIG. 4, can be applied, for example, to an electric motor drive system that includes a controller 210 that is coupled to an electric induction machine 120 and to an inverter module 110 that is also coupled to the electric induction machine 120. As such, steps 620, 630, 640, 650 and 660 of method 600 are similar to steps 420, 430, 440, 450 and 460 of method 400 of FIG. 4.

However, in the embodiments of FIG. 6, the controller 210 also determines/calculates a value of predicted torque command ($T_{Predcmd}$). In some application, it is possible to predicted the torque command in advance. If the predicted torque command is given, the controller can calculate the flux level corresponding to the predicted torque from a torque vs. flux table for the optimal efficiency operation. And then the controller can generate the flux current (Ids_e) to produce the flux in order to improve the torque dynamics. In method 600, at 610, the controller 210 determines whether a maximum value of the predicted torque command ($T_{Predcmd}$) and the computed torque command ($T_{cmd}$), is less than a minimum torque threshold ($T_{min}$) that is required to disable switching of electronics 182-193 in the inverter module 110. In other words, at 610, the controller 210 determines whether both of (1) the predicted torque command ($T_{Predcmd}$) and (2) the computed torque command ($T_{cmd}$) are less than a minimum torque threshold ($T_{min}$) that is required to disable switching of electronics 182-193 in the inverter module 110.

When the controller 210 determines at 610 that the maximum value of the predicted torque command ($T_{Predcmd}$) and the computed torque command ($T_{cmd}$) is greater than the minimum torque threshold ($T_{min}$), the method 600 proceeds to 650, which proceeds as described above with respect to 450.

When the controller 210 determines at 610 that the maximum value of the predicted torque command ($T_{Predcmd}$) and the computed torque command ($T_{cmd}$) is less than the minimum torque threshold ($T_{min}$), the method 600 proceeds to 620, which proceeds as described above with respect to 420.

Embodiments that are in accordance with the present invention reside primarily in combinations of method steps and apparatus components related to reducing power loss in an electric motor drive system. Those of skill would further appreciate that the various illustrative logical blocks, modules, circuits, and algorithm steps described in connection with the embodiments disclosed herein may be implemented as electronic hardware, computer software, or combinations of both. As used herein the term "module" refers to a device, a circuit, an electrical component, and/or a software based component for performing a task. Some of the embodiments and implementations are described above in terms of functional and/or logical block components (or modules) and various processing steps.

For example, the control circuits described herein may comprise various components, modules, circuits and other logic which can be implemented using a combination of analog and/or digital circuits, discrete or integrated analog or digital electronic circuits or combinations thereof. In some implementations, the control circuits described herein can be implemented using one or more application specific integrated circuits (ASICs), one or more microprocessors, and/or one or more digital signal processor (DSP) based circuits when implementing part or all of the control logic in such circuits. However, it should be appreciated that such block components (or modules) may be realized by any number of hardware, software, and/or firmware components configured to perform the specified functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It will be appreciated that embodiments of the invention described herein may be comprised of one or more conventional processors and unique stored program instructions that control the one or more processors to implement, in conjunction with certain non-processor circuits, some, most, or all of the functions for reducing power loss in an electric motor drive system, as described herein. As such, these functions may be interpreted as steps of a method for reducing power loss in an electric motor drive system. The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for reducing power loss in an electric motor drive system comprising a controller, an electric machine and an inverter module, the method comprising the steps of:
    determining, at the controller, whether a torque command ($T_{cmd}$) is less than a minimum torque threshold ($T_{min}$);
    incrementing a counter when the controller determines that the torque command ($T_{cmd}$) is less than the minimum torque threshold ($T_{min}$);
    determining, at the controller, whether the torque command ($T_{cmd}$) remains less than the minimum torque threshold ($T_{min}$);
    determining, at the controller when the torque command ($T_{cmd}$) remains less than the minimum torque threshold ($T_{min}$), whether a current count maintained at the counter is greater than or equal to a count threshold ($n_{th}$); and
    generating a disable signal at the controller to disable switching within the inverter module when the controller determines that the current count maintained at the counter is greater than or equal to a count threshold ($n_{th}$).

2. A method according to claim 1, wherein the minimum torque threshold ($T_{min}$) is less than or equal to a threshold torque value below which switching of electronics within the inverter module is to be disabled, and wherein the step of generating a disable signal at the controller to disable switching within the inverter module, comprises:
    generating a disable signal at the controller to disable switching of electronics within the inverter module when the controller determines that the current count maintained at the counter is greater than or equal to the count threshold ($n_{th}$).

3. A method according to claim 1, further comprising:
    generating an enable signal at the controller to allow switching within the inverter module whenever the controller determines that either the torque command ($T_{cmd}$) is not or does not remain less than the minimum torque threshold ($T_{min}$).

4. A method according to claim 3, further comprising:
    resetting the counter after generating the enable signal.

5. A method according to claim 1, wherein the minimum torque threshold ($T_{min}$) is an absolute value greater than zero.

6. A method according to claim 1, wherein the count threshold ($n_{th}$) is a value after which switching within the inverter module is to be disabled.

7. A method according to claim 1, wherein the count threshold ($n_{th}$) is a count of a number of times that the controller waits after incrementing the counter a first time while the torque command ($T_{cmd}$) remains less than the minimum torque threshold ($T_{min}$) to ensure that the electric motor drive system has stabilized before determining whether switching within the inverter module is to be either disabled or allowed to switch.

8. A method according to claim 1, wherein the electric machine is an electric induction machine.

9. A method according to claim 1, wherein the electric machine is a permanent magnet electric machine, and wherein the method further comprises:
after the controller determines that the torque command ($T_{cmd}$) is less than the minimum torque threshold ($T_{min}$), determining, at the controller, whether a stator current command ($I_{scmnd}$) is less than a stator current threshold ($I_{sth}$); and
when the controller determines that the stator current command ($I_{scmnd}$) is less than the stator current threshold ($I_{sth}$), determining, at the controller and before incrementing the counter, whether a back electromotive force ($B_{emf}$) value is less than a product of a margin (m) and a DC link voltage ($V_{dc}$).

10. A method according to claim 9, wherein the step of incrementing a counter, comprises:
incrementing the counter when the controller determines that the torque command ($T_{cmd}$) is less than the minimum torque threshold ($T_{min}$), that the stator current command ($I_{scmnd}$) is less than the stator current threshold ($I_{sth}$), and that the back electromotive force ($B_{emf}$) value is less than the product of the margin (m) and the DC link voltage ($V_{dc}$).

11. A method according to claim 10, wherein the step of generating a disable signal at the controller further comprises:
generating the disable signal at the controller to disable switching within the inverter module when the controller determines that the torque command ($T_{cmd}$) is less than the minimum torque threshold ($T_{min}$) and that the torque command ($T_{cmd}$) remains less than the minimum torque threshold ($T_{min}$) after incrementing the counter, that the stator current command ($I_{scmnd}$) is less than the stator current threshold ($I_{sth}$) and that the stator current command ($I_{scmnd}$) remains less than the stator current threshold ($I_{sth}$) after incrementing the counter, that the back electromotive force ($B_{emf}$) value is less than the product of the margin (m) and the DC link voltage ($V_{dc}$) and that the back electromotive force ($B_{emf}$) value remains less than the product of the margin (m) and the DC link voltage ($V_{dc}$) after incrementing the counter, and that the current count value (n) maintained at the counter is greater than the count threshold ($n_{th}$).

12. A method according to claim 9, further comprising:
generating an enable signal at the controller to allow switching in the inverter module whenever the controller determines that either: the torque command ($T_{cmd}$) is greater than or equal to the minimum torque threshold ($T_{min}$) that is required to disable the inverter module; the current command ($I_{scmnd}$) is not less than the stator current threshold ($I_{sth}$); or the back electromotive force ($B_{emf}$) value is not less than the product of the margin (m) and the DC link voltage ($V_{dc}$).

13. A method according to claim 9, wherein the stator current threshold ($I_{sth}$) is calibratable value such that any stator current command less than the stator current threshold ($I_{sth}$) indicates that stator current flowing in the permanent magnet electric machine is negligible, wherein the margin (m) is a calibratable margin greater than zero and less than one that is set to ensure that the back electromotive force ($B_{emf}$) value is less than a percentage of the DC link voltage ($V_{dc}$).

14. An electric motor drive system, comprising:
an electric machine;
an inverter module coupled to the electric machine;
a counter; and
a controller that is configured to compare a torque command ($T_{cmd}$) to a minimum torque threshold ($T_{min}$) that is required to disable the inverter module, to increment the counter when the torque command ($T_{cmd}$) is less than the minimum torque threshold ($T_{min}$), to confirm that the torque command ($T_{cmd}$) remains less than the minimum torque threshold ($T_{min}$) after incrementing the counter, to determine, when the torque command ($T_{cmd}$) remains less than the minimum torque threshold ($T_{min}$), whether a current count value (n) maintained at the counter is greater than a count threshold ($n_{th}$) after which the inverter module is to be disabled, and to generate a disable signal to disable switching within the inverter module when the current count value (n) maintained at the counter is greater than the count threshold ($n_{th}$).

15. An electric motor drive system according to claim 14, wherein the minimum torque threshold ($T_{min}$) is less than or equal to a threshold torque value below which switching of electronics within the inverter module is to be disabled, and wherein the controller is configured to generate the disable signal to disable switching of electronics within the inverter module when the controller determines that the current count value (n) maintained at the counter is greater than the count threshold ($n_{th}$).

16. An electric motor drive system according to claim 14, wherein the electric machine is an electric induction machine, and wherein the controller is configured to generate an enable signal to allow switching within the inverter module whenever the controller determines that the torque command ($T_{cmd}$) is not less than the minimum torque threshold ($T_{min}$).

17. An electric motor drive system according to claim 14, wherein the electric machine is a permanent magnet electric machine, and wherein the controller is further configured to determine whether a stator current command ($I_{scmnd}$) is less than a stator current threshold ($I_{sth}$) after the controller determines that the torque command ($T_{cmd}$) is less than the minimum torque threshold ($T_{min}$), and to determine, before incrementing the counter, whether a back electromotive force ($B_{emf}$) value is less than a product of a margin (m) and a DC link voltage ($V_{dc}$) when the stator current command ($I_{scmnd}$) is determined to be less than the stator current threshold ($I_{sth}$).

18. An electric motor drive system according to claim 17, wherein the controller is further configured to:
increment the counter when the torque command ($T_{cmd}$) is determined to be less than the minimum torque threshold ($T_{min}$), the stator current command ($I_{scmnd}$) is determined to be less than the stator current threshold ($I_{sth}$), and the back electromotive force ($B_{emf}$) value is determined to be less than the product of the margin (m) and the DC link voltage ($V_{dc}$); and
generate the disable signal to disable switching within the inverter module when the controller determines after incrementing the counter that the torque command ($T_{cmd}$) remains less than the minimum torque threshold ($T_{min}$), that the stator current command ($I_{scmnd}$) remains less than the stator current threshold ($I_{sth}$), that the back electromotive force ($B_{emf}$) value remains less than the product of the margin (m) and the DC link voltage ($V_{dc}$), and that the current count value (n) maintained at the counter is greater than the count threshold ($n_{th}$).

19. An electric motor drive system according to claim 18, wherein the controller is further configured to:
generate the enable signal to allow switching in the inverter module whenever the controller determines that either: the torque command ($T_{cmd}$) is greater than or equal to the minimum torque threshold ($T_{min}$); the current command ($I_{scmnd}$) is not less than the stator current threshold ($I_{sth}$);

and the back electromotive force ($B_{emf}$) value is not less than the product of the margin (m) and the DC link voltage ($V_{dc}$).

20. A controller for an inverter module of an electric motor drive system, the controller comprising:
   a timer that is started when a torque command ($T_{cmd}$) is determined to be less than a minimum torque threshold ($T_{min}$) that is required to disable the inverter module; and
   a signal generator module designed to generate a disable signal to disable switching within the inverter module when the torque command ($T_{cmd}$) remains less than the minimum torque threshold ($T_{min}$) after starting the timer and a current time value (t) maintained at the timer is determined to be greater than a wait time threshold ($t_{th}$) after which the inverter module is to be disabled.

* * * * *